3,553,291
PROCESS OF CURING UNSATURATED
POLYESTER RESINS USING ACETY-
LENIC DIPERESTERS
Ronald L. Friedman and Roger N. Lewis, Pinole, Calif.,
assignors to Argus Chemical Corporation, a corporation of Delaware
No Drawing. Original application Dec. 3, 1965, Ser. No.
511,354, now Patent No. 3,444,230, dated May 13,
1969. Divided and this application July 15, 1968, Ser.
No. 770,879
Int. Cl. C08f 21/00; C08g 17/12
U.S. Cl. 260—861                                 6 Claims

ABSTRACT OF THE DISCLOSURE

Aliphatic diperesters of alkyne diols having the formula:

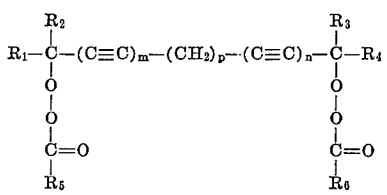

where $R_1$, $R_2$, $R_3$ and $R_4$ are lower hydrocarbon groups, $m$ and $n$ are 0 or 1 with the proviso that their sum is always at least one, $p$ is a positive integer, and $R_5$ and $R_6$ are the same or different aliphatic groups of from 1 to 20 carbon atoms are useful as catalysts for the free radical initiated polymerization of polyesters. Use of these diperesters as catalysts eliminate various distortions in the structure of the finished molded resin product.

---

This is a division of application, Ser. No. 511,354, filed Dec. 3, 1965, now U.S. Pat. 3,444,230.

This invention relates to an improved process for polymerizing polyesters and to certain novel peresters of polyfunctional peroxy alkynes which are especially suitable as catalysts for such polymerization reactions.

The plastics industry makes a great deal of use of polyester materials which are polymerized, cured and molded into a variety of end products. The polymerisation reaction is prevalently initiated with organic peroxide free radical catalysts. One problem encountered during curing and molding of polyesters initiated with the presently available peroxides, is the relatively large number of finished articles which must be discarded as unsaleable because of flaws in the resin structure. With most available catalysts, the resin tends to crack, craze and shrink during curing frequently enough to present an economic problem to the molder.

The present invention is based upon the discovery that diperesters of alkyne diols will substantially eliminate the various distortions of the finished molded resin noted above. This advantage in the curing and molding of polyesters has been found to be common to all disperesters of alkyne diols, including diperesters in which the organic group attached tothe carbonyl radical is either aromatic or aliphatic.

In discovering the broad principle by which molded polyester distortion is substantially reduced, a new group of compounds was discovered. Thus, within the large group of alkyne diperesters which are useful in the present process, diperesters in which the esterifying group is aliphatic are new compounds. This group of compounds constitutes inventive subject matter in this application in addition to the broad process of curing and molding polyesters with all alkyne disperesters.

Certain of the new aliphatic diperesters of alkyne polyols have been shown to possess unexpected and advantageous properties which set them apart from the other members of the new aliphatic diperester group. The aliphatic diperesters in which the alpha carbon atom of the esterifying group is secondary or tertiary represents a group of preferred catalysts which produce desirable cures of resin within shorter periods of time and/or produce higher peak resin temperatures during the cure than are obtainable with other diperesters and related peroxide catalysts generally known and used for comparable commercial applications. In addition, these preferred branched chain diperesters produce resin end products having little or no discoloration.

By way of further definition, the new class of aliphatic diperesters of alkyne diols herein discovered have the following general structural formula:

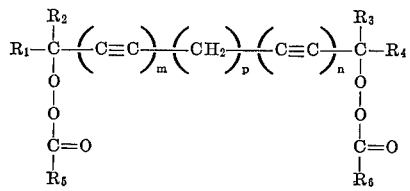

wherein $R_1$, $R_2$, $R_3$ and $R_4$ are hydrocarbon groups, preferably saturated or unsaturated lower hydrocarbon groups, i.e., having from about 1 to 5 carbon atoms, which may be in a straight chain or branched. The $m$ and $n$ are whole number integers from 0 to 1 with the proviso that their sum always be at least 1. The $p$ is a positive whole number integer. $R_5$ and $R_6$ may be the same or different aliphatic groups of from 1 to 20 carbon atoms having noninterfering substituents as desired. Such radicals include propyl, isobutyl, decyl, ecosyl and the like. To take advantage of the solubility of these catalysts with polyesters, it is desirable to limit the $R_5$ and $R_6$ groups to about 12 carbon atoms.

As hereinbefore mentioned, the catalysts useful in the process of this invention also include the diperesters of alkyne diols wherein the perester linkage results from the addition of a carbonyl-containing aromatic group to an organic diperoxide, i.e. wherein $R_5$ and $R_6$ in the above structural formula are hydrocarbons such as similar or dissimilar aryl groups, of from 6 to 20 acarbon atoms, for example, phenyl, benzyl and the like.

The diperesters of alkyne diols in which the carbonyl linkage of the diperester is attached to either an aromatic or aliphatic group, when employed to initiate the polymerization of polyesters, substantially eliminate the undesirable distortion or warping prevalent in present conventional molding operations.

Examples of the compounds of this invention which have been found to initiate the polymerization of polyesters without the attendant disadvantages generally found in the prior art include the following among many others which could be listed:

2,5-dimethyl-2,5-diper(2-ethyl hexanoate) hexyne-3
2,5-diethyl-2,5-diper(2-ethyl hexanoate) hexyne-3
2,5-dimethyl-2,5-diper(octanoate) hexyne-3
2,5-dimethyl-2,5-diperbenzoate hexyne-3
2,5-dimethyl-2,5-diperdecanoate hexyne-3
2,5-dimethyl-2,5-diper(2,2-diethyl hexanoate) hexyne-3
2,5-dimethyl-2-per(2-ethyl hexanoate)-5-peroctanoate hexyne-3
2,5-dimethyl-2,5-diper(pivalate) hexyne-3
2,5-dimethyl-2,5-diper(2-propyl pentanoate) hexyne-3

Generally, prior art peroxides having acetylenic unsaturation are known to be "slow" catalysts, especially in comparison to the corresponding saturated peroxides. By this is meant that the polymerization reactions initiated by the prior art acetylenic peroxides do not reach peak temperature as rapidly as the corresponding prior art saturated peroxides. As a result thereof, curing requires a longer period of time. In this regard, there appears to be a direct correlation between the "half life" of the particular prior art peroxide catalyst and the length of time needed to reach peak temperature, i.e., the "half life," as well as "time to peak temperature," of the acetylenic unsaturated peroxides have generally been substantially longer than the "half life" and the "time to peak temperature" of the corresponding saturated peroxide.

The acetylenic unsaturated peroxides used in the process of this invention, i.e., the diperesters of alkyne diols, usually have a longer "half life" than the corresponding diperester of an alkane diol, in some cases longer by more than a factor of 3; see Table I. However, in spite of this apparent undesirable length of "half life," the diperesters of alkyne diols have been found to be generally "fast" catalysts when compared to the corresponding saturated diperester; see Table II in Example III. Further, as will be seen in Table II, when the branched chain and aromatic diperesters of alkyne diols are compared to each other, it has been found that the branched chain diperesters are much "faster" catalysts.

TABLE I

| | Half-life (hours) at 100° C. |
|---|---|
| 2,5-dimethyl-2,5-diperbenzoate hexane | 6 |
| 2,5-dimethyl-2,5-diperbenzoate hexyne-3 | 22 |
| 2,5-dimethyl-2,5-diper(2-ethyl hexanoate) hexane | 0.15 |
| 2,5-dimethyl-2,5-diper(2-ethyl hexanoate) hexyne-3 | 0.20 |

Therefore, in the preferred aspect of this invention, the organic group attached to the carbonyl linkage of the perester are branched alkyl groupings, i.e., wherein the carbon atom attached directly to the carbonyl group (the alpha carbon) is either a secondary or a tertiary carbon atom. Such catalysts, employed to initiate the polymerization of polyesters, not only substantially eliminate distortion and reduce discoloration, they are also "fast," i.e., they shorten the time necessary to reach peak curing temperature and/or increase the peak curing temperature, especially in comparison to prior art organic peroxide catalysts. This desirable attribute has the beneficial effect of completing the curing process in a shorter lapsed time, thereby enabling more product units to be molded during a given time period.

These preferred diperesters of alkyne diols are illustrated by the following structural formula:

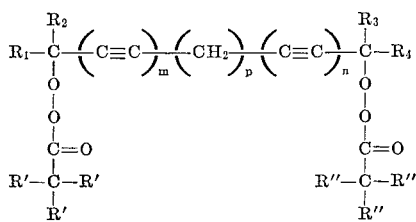

wherein $R_1$, $R_2$, $R_3$, $R_4$, $m$ and $n$ have the definitions given above, $p$ is preferably a positive whole number integer from 0 to 4 and R' and R'' are selected from the group containing the hydrogen atom and alkyl radicals, provided that at least 2 R's and 2 R''s are alkyl radicals. Hence, it will be seen that each carbon atom attached directly to a carbonyl group, i.e., the alpha carbon atom, is either a secondary or tertiary carbon atom.

As before, it is preferred that the three R's and the three R''s total not more than about 19 carbon atoms so that each of the alkyl groups attached directly to the carbonyl groups are limited to about 20 carbon atoms.

The organic diperesters of the invention may be prepared by the conventional techniques generally known to one skilled in this art. These include the reaction of a dihydroperoxide of the corresponding dihydroxy alkyne with a carboxylic acid (R—COOH), wherein the organic radical (R) corresponds to the hydrocarbon radical desired in the diperester catalyst. It is preferred to employ an acid halide, such as a chloride, of the corresponding carboxylic acid in the reaction with the dihydroperoxide to form the ester. In addition, the corresponding anhydride of the carboxylic acid can be utilized.

The esterification reaction can be executed in a suitable solvent such as chloroform. However, there are many suitable reactants that may require no solvent. When an acid halide is used, an organic or inorganic base is employed to neutralize the acid liberated in the esterification reaction. The base is suitably employed in excess. The reaction proceeds fairly rapidly in most cases and is complete within several hours. In most instances, no heat need be applied, although in the formation of certain of the catalysts, slight warming may be desirable.

Normally, an ester group will be desired at both sites of the diperoxide molecule. Therefore, at least 2 moles of, for example, the acid halide will be used for each mole of the hydroperoxy alkyne. If mixed esters are sought, one mole of each of the acid halides selected can be reacted with one mole of the hydroperoxy alkyne.

The polymerization process of this invention is capable of wide application to conventional polyesters which polymerize when subjected to peroxide-type catalysts. Examples of this broad grouping, well known to those skilled in this art, are illustrated in the McGraw-Hill Encyclopedia of Science and Technology, vol. 10, pp. 466–468, 1960.

Thus, at page 466, it is closed that polyester resins are polymeric materials in which ester groups

are in the main chains. The aliphatic polyesters tend to be relatively soft, and the aromatic derivatives are usually hard and brittle or tough. The properties of either group may be modified by cross linking, crystallization, plasticizers, or fillers.

The commercial products are alkyds which are used in paints and enamels, unsaturated polyesters or unsaturated alkyds which are used extensively with fiber glass for boat hulls and panels, polyethylene terephthalate which is used in the form of fibers and films, and the aromatic polycarbonates.

Furthermore, at page 467, when utilizing unsaturated polyesters, a low-molecular-weight, unsaturated polyester intermediate is first produced. The reaction of maleic anhydride with diethylene glycol is typical.

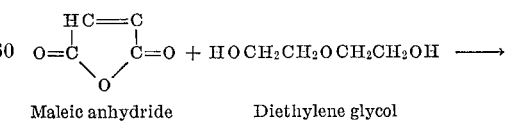

The product is a viscous oil of molecular weight of 2000–4000.

The low-molecular-weight unsaturated polyester will cross link in the presence of a peroxide by copolymerization with styrene or other vinyl monomers. The unsaturated maleic group copolymerizes in essentially a 1:1 ratio with styrene. Therefore, each styrene molecule which reacts effectively joins two ester chains together to yield an insoluble cross-linking structure, such as

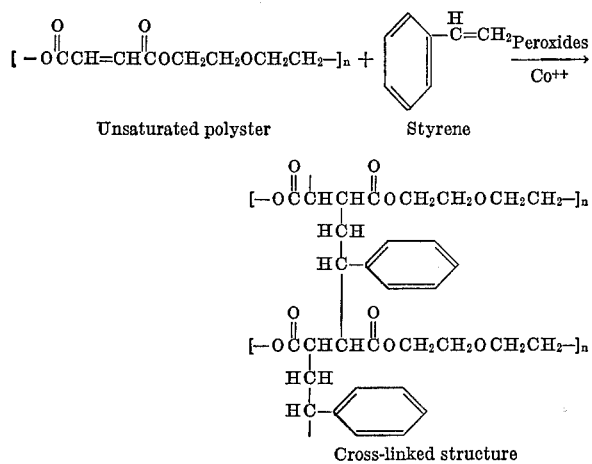

Unsaturated polyster   Styrene

Cross-linked structure

The commercially available intermediate unsaturated polyesters usually contain about 30% styrene or other vinyl monomer. On addition of a peroxide or other free-radical catalyst and a paint drier, the copolymerization starts. In this stage, the resin may be handled as a viscous fluid for a few minutes to a few hours, depending upon the activity of the catalyst. The viscous liquid may be applied to glass fiber (with a special surface treatment) in the form of matt, tow, roving, or cloth, with precautions to eliminate air bubbles and to avoid bubbles that may be caused by overheating as a result of too rapid curing. The surface of the glass fiber must have been given a special finishing treatment in advance for the polyester to adhere strongly. Glass fibers treated with a vinyl silicone or an organochrome complex are commercially available.

In the absence of the paint drier, oxygen of the air has an inhibiting effect on the curing process with the result that the surface of the product remains soft after the inner portions have hardened. In the presence of a paint drier, such as cobalt naphthenate, this skinning effect is eliminated.

In recent years, a number of modifications of the composition described above have been made. Other acids, other glycols, and various combinations may be used to vary properties, such as flexibility, of the final product. The chlorinated derivatives have higher resistance to burning. By varying the free-radical initiator, the optimum temperature required for curing may be varied. There are thermosetting molding compositions which have glass fiber as a filler, and a catalyst which is relatively inactive at ordinary temperatures. The mixture is cross linked in the heated mold by the conventional process for thermosetting molding compounds.

In addition, polydiallyl esters are polymers of diallyl esters, such as diallyl phthalate, diallyl carbonate, diallyl phenyl phosphonate, and diallyl succinate, in which cross-linked products are produced by polymerization of the allyl groups, as in the case of diallyl phthalate:

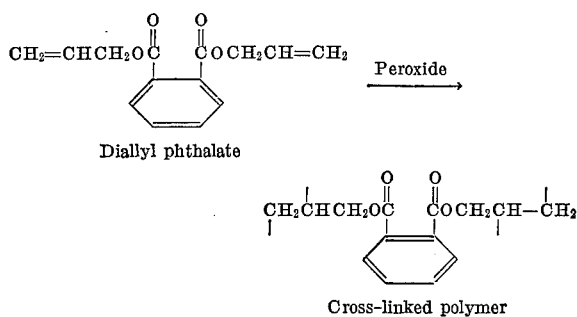

Diallyl phthalate

Cross-linked polymer

Thermosetting molding compounds may be produced by careful limitation of the initial polymerization to yield a product which is fusible. Then the polymerization and curing are completed in the final molding operation.

Copolymers of diallyl phenyl phosphonate with methyl methacrylate may have a refractive index equal to that of glass. Glass fiber laminates of the product are almost clear, and are resistant to burning.

In commercial application, conventional curing and molding of polyesters are usually accomplished in molds which are maintained at elevated temperatures, such as 180–250° F., to reduce the reaction time to a minimum.

To further illustrate the novel process of this invention, the following examples are provided. It should be understood that the details thereof are not to be regarded as limitations as they may be varied as will be understood by one skilled in this art.

EXAMPLE I

Preparation of 2,5-dimethyl-2,5-dihydroperoxy hexyne-3

To a cold mixture (−2° C.) of 52.5 grams of 50% hydrogen peroxide and 69 grams of 95.5% sulfuric acid was added in small portions over a period of one hour, 50 grams of 2,5-dimethyl-2,5-dihydroxy hexyne-3. Mechanical stirring was continued for four hours while the temperature was maintained between −0.5° and +0.5° C. The mixture was then diluted with an equal volume of saturated sodium sulfate and extracted with ether. The ether extract was dried and the ether removed under reduced pressure.

The yield was 84% of the theoretical and had a purity of 83% based on active oxygen.

EXAMPLE II

Preparation of acetylenic diperesters (a) Preparation of 2,5-dimethyl-2,5-diper (2-ethyl hexanoate) hexyne-3.—257 grams of ice and 152.61 grams of 50% sodium hydroxide were mixed together and cooled to about 13° C. 52.38 grams of 2,5-dimethyl-2,5-dihydroperoxy hexyne-3 (95.2% purity) was added to the stirred mixture. Thereupon the temperature rose to about 20° C. 159.76 grams of 2-ethyl hexanoyl chloride (87.5% purity) was added very rapidly and the temperature maintained at 40° C. The mixture was rapidly stirred during this addition of the acid chloride and continued until the end of the reaction. The addition time of acid chloride was about 15 minutes. The reaction continued for another 15 minutes. The reaction mixture was then cooled to about 20° C. and sodium chloride and ether added to aid phase separation. The organic layer was washed twice with dilute potassium hydroxide (pH 11), thrice with water, once with dilute sulfuric acid (pH 1), and twice more with water. The resulting product was thereafter dried with sodium sulfate, filtered and concentrated under vacuum.

The product had a purity of 96.5% and was 78.8% of the theoretical yield.

(b) Preparation of 2,5 - dimethyl - 2,5 - diperbenzoate hexyne-3.—In a process similar to Example IIa, 2,5-dimethyl-2,5-diperbenzoate hexyne-3 was prepared from benzoyl chloride in a yield of about 80% of the theoretical, with a purity of about 85%.

(c) Preparation of 2,5 - dimethyl - 2,5 - diperdecanoate hexyne-3.—In a process similar to Example IIa, 2,5-dimethyl-2,5-diperdecanoate hexyne-3 was prepared from decanoyl chloride in a yield of about 75% of the theoretical, with a purity of about 80%.

EXAMPLE III

Polymerization initiation

As previously set forth, the compounds of the present invention are most useful in catalyzing reactions that are initiated by the presence of free radicals. The diperesters of alkyne diols, catalysts which form free radicals, initiate the polymerization of polyesters. These diperester catalysts are employed in the same manner as other known peroxides.

The polymerized resins listed in Table II below were obtained in the following manner:

To 99.5 grams of the polymerizable polyester was added 0.5 gram of the diperester. Each of the mixtures were placed in contact with a mold and placed in an oven which had been preheated to the temperature indicated, and the mixture retained therein until cured.

prising incorporating with an ethylenically unsaturated polyester of a carboxylic acid a catalytic amount of:

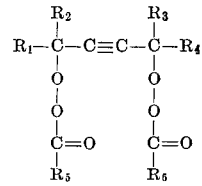

TABLE II

| Catalyst | Plaskon P.E. 942 | | | Hetron 92 | | | Plaskon P.E. 461 | | |
|---|---|---|---|---|---|---|---|---|---|
| | Initial mold temperature (° F.) | Peak temperature (° F.) | Time to peak temperature (min.) | Initial mold temperature (° F.) | Peak temperature (° F.) | Time to peak temperature (min.) | Initial mold temperature (° F.) | Peak temperature (° F.) | Time to peak temperature (min.) |
| 2,5-dimethyl-2,5-diper (2-ethyl hexanoate) hexane | 180 | 412 | 32.5 | | | | | | |
| | 212 | 394 | 15.5 | 250 | 410 | 10.0 | 250 | 430 | 8.5 |
| | 250 | 442 | 11.2 | | | | | | |
| 2,5-dimethyl-2,5-diper (2-ethyl hexanoate) hexyne-3 | 180 | 419 | 29.5 | | | | | | |
| | 212 | 403 | 16.0 | 250 | 406 | 9.0 | 250 | 424 | 9.4 |
| | 250 | 428 | 9.5 | | | | | | |
| 2,5-dimethyl-2,5-diperdecanoate hexyne-3 | 180 | 340 | 66.5 | | | | | | |
| | 212 | 372 | 35.5 | | | | | | |
| 2,5-dimethyl-2,5-diperbenzoate hexane | 212 | 383 | 46.0 | | | | | | |
| 2,5-dimethyl-2,5-diperbenzoate hexyne-3 | 212 | 372 | 39.5 | | | | | | |

Table II is a comparison of reaction results, i.e., the time to peak temperature and peak temperature, produced with polyesters when subjected to variations in the initial oven, i.e., mold temperature. Visual observance revealed a substantially complete lack of distortion in the resin products wherein the curing process was catalyzed with the diperesters of alkyne diols. In contrast, the reaction products catalyzed with the diperesters of alkane diols were generally irregularly formed and distorted. In addition, the diperesters of both alkyne and alkane diols, having a branched alkyl grouping attached to the carbonyl radical, produced extremely "fast" reactions.

It will be appreciated by one of skill in this art that there is no peroxide catalyst which has totally superior properties when employed with all types of commercially available polyester resins under all conditions. However, it will be seen from the data in Table II that the diperesters of this invention, and especially the preferred diperesters containing a branched alkyl group, exhibited properties such as peak temperature and/or time to peak temperature, which were generally superior to those found for the corresponding diperester of an alkane diol.

Although the foregoing invention has been described in some detail by way of illustration and example for purposes of clarity of understanding, it is to be understood that certain changes and modifications may be practiced within the spirit of the invention as limited only by the scope of the appended claims.

What is claimed is:

1. In the process for molding polyester resins from free radical initiated polyesters, the improvement comprising incorporating with an ethylenically unsaturated polyester of a carboxylic acid a catalytic amount of:

where $R_1$, $R_2$, $R_3$, and $R_4$ are lower alkyl groups of about one to five carbon atoms, $R_5$ and $R_6$ are aliphatic groups of 1 to 20 carbons, phenyl and benzyl, and wherein physical distortion of cured molded resin is minimized.

2. A method in accordance with claim 1 wherein in the free radical initiator, $R_1$, $R_2$, $R_3$ and $R_4$ are methyl radicals.

3. A method in accordance with claim 2 wherein in the free radical initiator, $R_5$ and $R_6$ are phenyl radicals.

4. A method in accordance with claim 2 wherein in the free radical initiator, $R_5$ and $R_6$ are alkyl radicals of from 3 to 12 carbon atoms.

5. A method in accordance with claim 4 wherein in the free radical initiator, $R_5$ and $R_6$ are alkyl radicals branched at the alpha carbon atom.

6. A method in accordance with claim 5 wherein in the free radical initiator, $R_5$ and $R_6$ are heptyl groups attached to the carbonyl linkage at its third carbon atom.

References Cited

UNITED STATES PATENTS 3,318,974  5/1967  Montesano _____ 260—861X
3,444,230  5/1969  Friedman et al. _____ 260—75T WILLIAM H. SHORT, Primary Examiner L. P. QUAST, Assistant Examiner U.S. Cl. X.R.

260—75, 78.5, 86.1